United States Patent [19]
Aikawa et al.

[11] Patent Number: 5,371,865
[45] Date of Patent: Dec. 6, 1994

[54] COMPUTER WITH MAIN MEMORY AND CACHE MEMORY FOR EMPLOYING ARRAY DATA PRE-LOAD OPERATION UTILIZING BASE-ADDRESS AND OFFSET OPERAND

[75] Inventors: Takeshi Aikawa, Tokyo; Kenji Minagawa, Chiba; Mitsuo Saito, Kanagawa, all of Japan

[73] Assignee: Kabushiki Kaisha Toshiba, Tokyo, Japan

[21] Appl. No.: 715,932

[22] Filed: Jun. 14, 1991

[30] Foreign Application Priority Data

Jun. 14, 1990 [JP] Japan ................... 2-155776

[51] Int. Cl.⁵ ...................... G06F 12/02; G06F 12/08
[52] U.S. Cl. .................................... 395/400; 395/425; 395/375; 364/DIG. 1; 364/262.4; 364/255; 364/243.42
[58] Field of Search ... 364/200 MS File, 900 MS File; 395/400, 425

[56] References Cited

U.S. PATENT DOCUMENTS

| | | | |
|---|---|---|---|
| 4,086,629 | 4/1978 | Desyllas et al. | 395/425 |
| 4,095,269 | 6/1978 | Kawabe et al. | 395/250 |
| 4,583,165 | 4/1986 | Rosenfeld | 395/400 |
| 4,888,679 | 12/1989 | Fossum et al. | 395/800 |
| 4,926,323 | 5/1990 | Baror et al. | 395/375 |

FOREIGN PATENT DOCUMENTS

0097790A3  1/1984  European Pat. Off. .
89/06397  7/1989

OTHER PUBLICATIONS

Journal of Parallel and Distributed Computing, "Strategies for Cache and Local Memory Management by Global Program Transformation", Oct. 5, 1988, No. 5, pp. 587–616.

Horikawa T. et al. "Performance Evaluation Of Cache Memory With A Prefetch Mechanism," Proceedings of IPSJ Annual Conference (Fall 1987), pp. 183–184.

*Primary Examiner*—David L. Robertson
*Assistant Examiner*—Matthew M. Kim
*Attorney, Agent, or Firm*—Finnegan, Henderson, Farabow, Garrett & Dunner

[57] ABSTRACT

A computer having a main memory for storing a plurality of data, a cache memory for temporarily storing a portion of the plurality of data, a processor for accessing data stored in the cache memory and processing the data according to instructions. The processor has an access instruction combined with a preload instruction, and an access instruction only for accessing data, and includes indicator circuitry for indicating a preload condition to the cache memory when the processor accesses data from the cache memory according to the access instruction combined with the preload instruction. The cache memory preloads data to be accessed next by the processor from the main memory when the processor indicates the preload condition.

6 Claims, 9 Drawing Sheets

```
int a[64][64], b[64][64], ab[64][64];
{
int i,j,k;

for(i = 0 ; i < 64 ; i++){
    for(j = 0 ; j < 64 ; j++){
        for(k = 0 ; k < 64 ; k++){
            ab[i][j] += a[i][k] * b[k][j];
        }
    }
}
}
```

Fig. 3A

```
lw      $24, 0($3)
lw      $25, 0($4)
mul     $8, $24, $25
lw      $9, 0($5)
addu    $10, $9, $8
sw      $10, 0($5)
addu    $2, $2, 1
addu    $3, $3, 1
addu    $4, $4, 64
bne     $2, $16, $34
```

*Fig. 3B*

```
lwa     $24, 1($3)
lwa     $25, 64($4)
mul     $8, $24, $25
luw     $9, 0($5)
addu    $10, $9, $8
sw      $10, 0($5)
addu    $2, $2, 1
bne     $2, $16, $34
```

Fig. 4B $$A = \begin{pmatrix} A_1 & A_2 & A_3 \\ A_4 & A_5 & A_6 \\ A_7 & A_8 & A_9 \end{pmatrix} \quad B = \begin{pmatrix} B_1 & B_2 & B_3 \\ B_4 & B_5 & B_6 \\ B_7 & B_8 & B_9 \end{pmatrix} \quad C = AB = \begin{pmatrix} C_1 & C_2 & C_3 \\ C_4 & C_5 & C_6 \\ C_7 & C_8 & C_9 \end{pmatrix}$$

COMPUTER WITH MAIN MEMORY AND CACHE MEMORY FOR EMPLOYING ARRAY DATA PRE-LOAD OPERATION UTILIZING BASE-ADDRESS AND OFFSET OPERAND

BACKGROUND OF THE INVENTION

1. Field of the Invention

The present invention relates to a computer, and more specifically to a cache memory contained in a computer for effectively preloading array data of a matrix from a main memory to the cache memory.

2. Discussion of the Related Art

In a computer, a cache memory is located between a processor and a main memory. The cache memory stores a portion of the data stored in main memory, along with corresponding addresses of the portion of data from the main memory. The capacity of the cache memory is typically small, compared to that of main memory, but its access speed is comparatively quite high. A processor reads data from the cache memory, processes the data, and writes the processed data into the cache memory. Access time (both read and write) of the computer can thus be reduced, in comparison with the access time required to access the main memory directly.

When the cache memory receives an access request (or access address) from the processor, the cache memory first checks whether the data corresponding to the access address are stored in the cache memory or not. If the data are not stored in the cache memory, the cache memory sends the access address to the main memory, and transfers the respective data corresponding to the respective access address from the main memory back to cache memory. In related devices, one block of data, including the data which corresponds to the access address, are transferred and stored in the cache memory. For example, one block of data usually consists of four sets of data corresponding to four continuous addresses. In this case, if the processor accesses continuous addresses in order, the processor will read continuous data from the cache memory in order. However, if the processor accesses address in a dispersed manner, a frequent result is that data corresponding to the respective access address are not stored in the cache memory. The cache memory must then transfer the required data from the main memory at that time.

The processor often executes a matrix calculation by sequentially reading out an array of data in a matrix format from the cache memory. The address area of this array of data is usually longer than the capacity of the cache memory permits. Accordingly, tile offset (interval) of the access address of the array of data is very large.

For example, the processor will read out an array of data corresponding to address 0. Next, the processor will read out an array of data corresponding to address 64. Third, the processor will read out an array of data corresponding to address 128. In this case, the offset of the access address (or address interval) is 64. However, the array of data corresponding to the address area (0~128) cannot be stored in the cache memory at one time, because, as mentioned earlier, the capacity of the cache memory is quite small. Therefore, whenever the processor accesses the array of data from the cache memory, the cache memory must first transfer the array of data from main memory. Obviously, some time is consumed during this transfer. During the transfer period, the processor is forced to wait, without being able to process data.

To prevent the above-mentioned defect, when the cache memory does not store the data corresponding to the respective access address, a method has been considered of having the cache memory transfer a block which includes the data corresponding to the respective access address, and also the next sequential data block. For example, if the present access address requested by the processor is 0, a first data block corresponding to address (0~3), along with the next data block corresponding to address (4~7), are both transferred from main memory to cache memory. This device operates on a prediction that the next data block will be accessed following the first data block. That is, in this device, the next data block neighboring the first access address is simply transferred from main memory to cache memory. As mentioned above, if the processor accesses an array of data of a matrix sequentially, the offset of the access address of the array data will also be large (for example, 64, 128). Accordingly, the next data block neighboring the first access address may not include the array of data which the processor needs to access next.

Moreover, in this device, the cache memory transfers the next block of data with the first block of data, including data corresponding to the present access address, only when the cache memory does not already store the data corresponding to the present access address. In short, if the cache memory happens to already store the data corresponding to the present access address, the cache memory will not transfer the neighboring data which may be accessed in the future. Therefore, even if the cache memory unexpectedly stores data corresponding to the present access address, it often happens that the cache memory does not store the data corresponding to the next access address when the processor needs to access the next array of data.

As also mentioned above, in the prior device, when the processor sequentially accesses the array of data of a matrix from the cache memory, it often happens that the cache memory does not store the array of data whose offset is large, and the cache memory must transfer the array of data from the main memory.

SUMMARY OF THE INVENTION

It is an object of the present invention to provide a computer, including a cache memory, which can effectively pre-load an array of data, including the data which the processor will access next in succession, from the main memory to the cache memory.

These and other objects of the present invention are accomplished by a computer, comprising: a main memory for storing a plurality of data; a cache memory for temporarily storing a portion of the plurality of data stored in the main memory; a processor for accessing the portion of data stored in the cache memory and for processing the data according to a processing instruction. The processor has a first access instruction, and a second access instruction combined with a pre-load instruction to serve as an instruction for accessing data, and includes means for indicating a pre-load condition to the cache memory when the processor accesses data from the cache memory according to the second access instruction combined with the pre-load instruction. The cache memory pre-loads another portion of data to be accessed next in succession by the processor from the main memory when the processor indicates the pre-load condition.

The accompanying drawings, which are incorporated in and constitute a part of the specification, illustrate a preferred embodiment of the invention. Together with the general description given above and detailed description given below, they serve to explain the principles of the invention.

DESCRIPTION OF THE PREFERRED EMBODIMENTS

Figure 1:
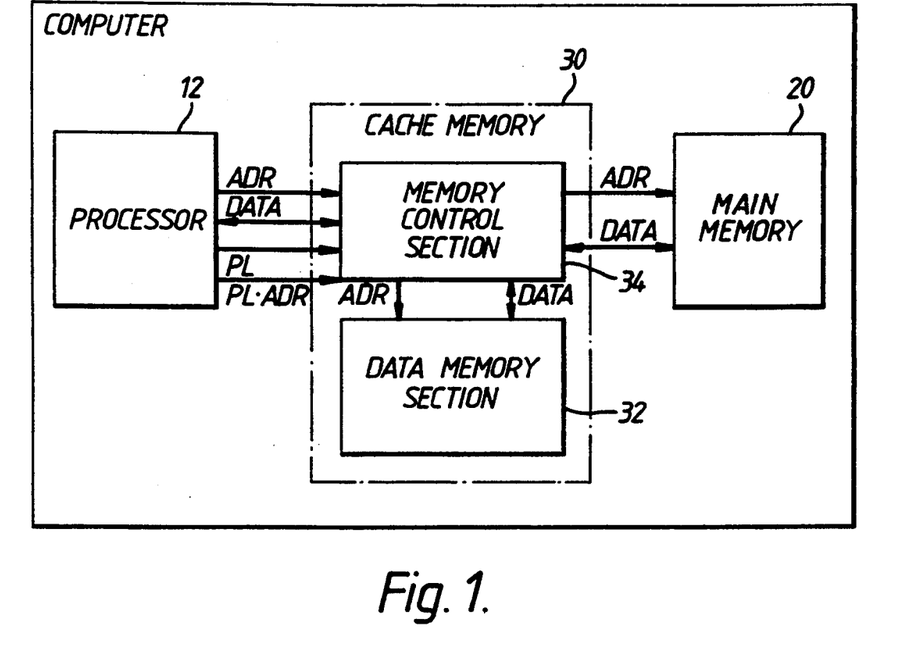
FIG. 1 is a block diagram representing a computer, including a cache memory, according to the present invention.

FIG. 1 is a block diagram depicting a computer, including a cache memory, according to the present invention. As embodied in FIG. 1, a processor 12 executes instructions of an object program, which was compiled from a source program. A main memory 20 stores a plurality of data corresponding to respective data addresses in order.

A cache memory 30 is located between processor 12 and main memory 20. Cache memory 30 comprises a data memory section 32, having a capacity which is smaller, but an access speed which is higher than that of main memory 20. Cache memory 30 further comprises memory control section 34 for controlling access to the data memory section 32. The data memory section 32 is capable of storing a portion of the plurality of data stored in main memory 20. The portion of data is a copy of data by block unit, and is stored in cache memory 30 with its corresponding data address.

In the computer as embodied in FIG. 1, the processor 12 accesses data (in the format of a read/write request) in the cache memory 30 according to an access instruction. When this occurs, memory control section 34 checks whether any data corresponding to the required access address are included in the data memory section 32 or not. If the data are included in the data memory section 32 (referred to as a "hit"), the memory control section 34 reads out the data corresponding to the access address from the data memory section 32, or writes the data to the access address in the data memory section 32. If the data are not included in the data memory section 32 (referred to as a "cache miss"), the memory control section 34 accesses the main memory 20 and loads a data block, including data corresponding to the access address, from the main memory 20 to data memory section 32. Next, memory control section 34 proceeds to access the request from the processor 12. When the new data block is loaded to the data memory section 32, another data block, specifically that data block which has been stored for the longest time in the data memory section 32, is displaced back to the main memory 20.

In accordance with the present invention, processor 12 has a second access instruction, which is usually in the form of a read/write request, combined with a pre-load instruction of which data are to be accessed next in succession. The next data are loaded from main memory 20 to data memory section 32. The processor 12 indicates a pre-load condition to the memory control section 34 when the processor accesses the cache memory 30 according to the second access instruction combined with the pre-load instruction.

In accordance with the invention, compiler software is provided for generating object instructions from source instructions. As embodied in FIGS. 4A and 4B, compiler 80 has the following characteristics. When compiler 80 detects loop instructions for accessing an array of data sequentially, compiler 80 generates the second access instruction combined with the pre-load instruction, instead of the normal first access instruction. When processor 12 accesses cache memory 30 according to the second access instruction combined with pre-load instruction, processor 12 indicates the pre-load condition to cache memory 30 by outputting a pre-load signal (PL) and a pre-load address (PL-ADR). Memory control section 34 in cache memory 30 pre-loads the data corresponding to the pre-load address (PL-ADR) only when the memory control section 34 receives pre-load signal (PL).

Figure 3A:
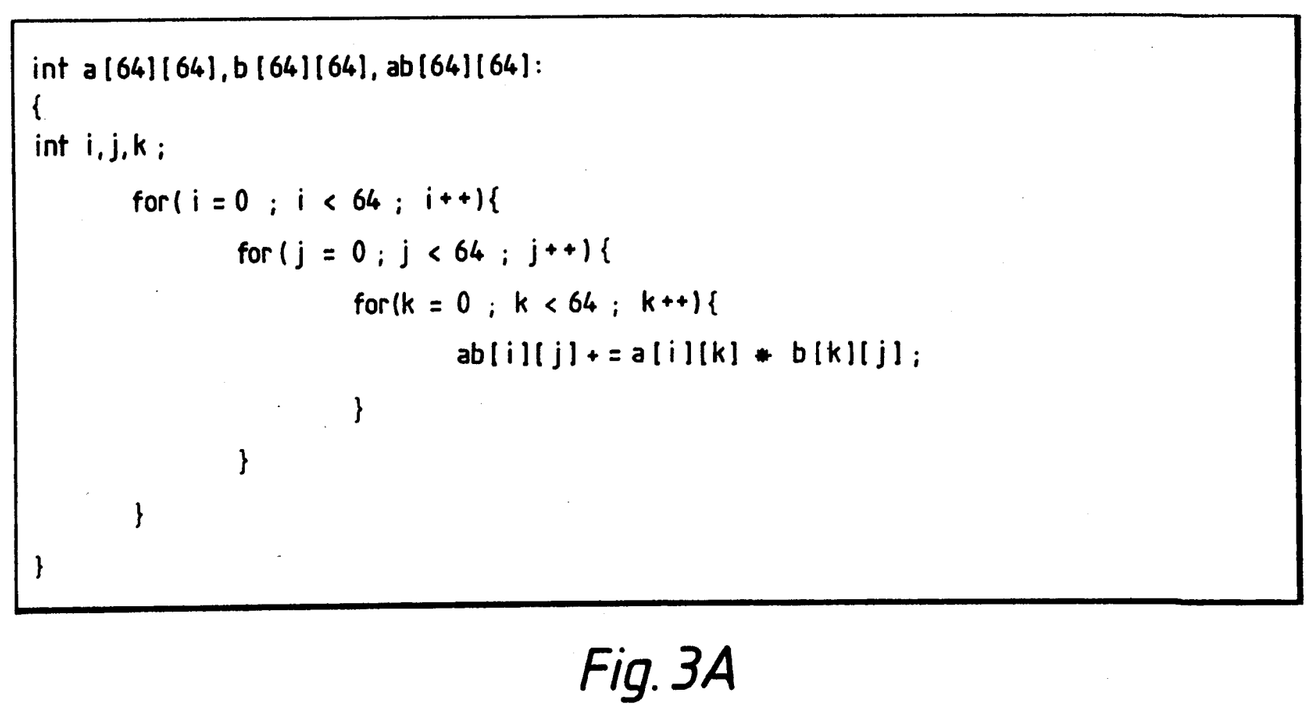
FIG. 3A is an example of a source program, including a matrix operation.

In the source instructions shown in FIG. 3A, a matrix of "a", "b", "ab" consists of (64×64) elements respectively.

$$ab[i][j] = a[i][k] \times b[k][j]$$

In the above formula, the value of ab[i][j] is determined by the product of a[i][k] and b[k][j], with the condition that parameters "k", "j", and "i" are respectively changed from "0" to "63".

Figure 3B:
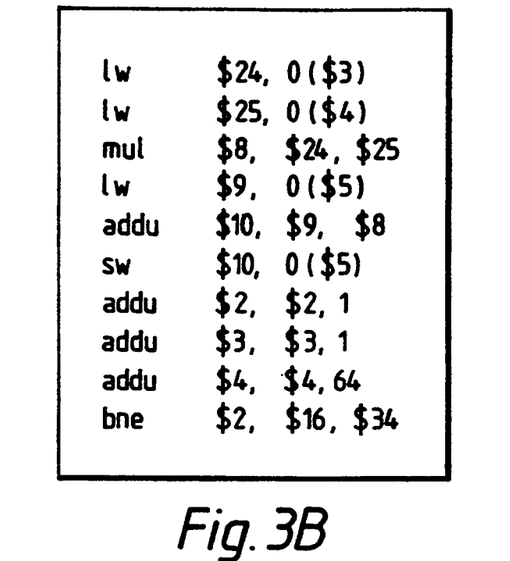
FIG. 3B is an example of object program compiled from source program shown in FIG. 3A according to the prior art.

In the object program according to the prior art, shown in FIG. 3B, the following instructions are given to load data from the cache memory to the processor.

lw $24, 0($3)  (1)

lw $25, 0($4)  (2)

In these instructions, "$24," "$25", "$3", "$4" means respectively number of registers in the processor. "($3)", "($4)" means that the address is stored in register "$3" and "$4". Therefore, instruction (1) requires loading data corresponding to address stored in register "$3" from cache memory, storing the data in register "$24". Instruction (2) is similar to instruction (1). In FIG. 3B, the following instructions calculate the next access address; by offset.

addu $3, $3, 1   (3)

addu $4, $4, 64   (4)

Instruction (3) requires increasing the address stored in the register "$3" by 1 and storing the address in register "$3" again. Instruction (4) is similar to instruction (3).

In the object instruction shown in FIG. 3B, an instruction to load data corresponding to the present access address and an instruction to calculate the next access address are separate. In short, a pre-load instruction to load data corresponding to the next access address is not included in these object instructions.

Figure 3C:
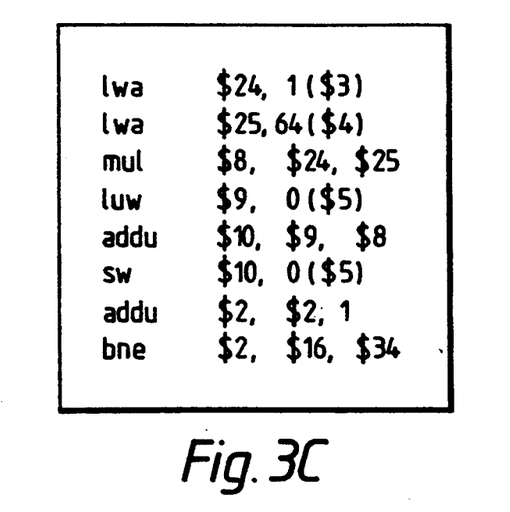
FIG. 3C is an example of an object program compiled from the source program shown in FIG. 3A, according to the present invention.

However, in the object program according to the present invention, as shown in FIG. 3C, the following instructions are to load data corresponding to the present access address and to pre-load data corresponding to the next access address.

lwa $24, 1($3)   (5)

lwa $25, 64 ($4)   (6)

Instruction (5) requires loading data corresponding to the address stored in register "$3", to store the data in register "$24" and to increase the address stored in register "$3" by 1. Instruction (6) is similar to instruction (5). In the object program shown in FIG. 3C, instruction "lwa" is used as a combination of instruction "lw" and "addu", shown in FIG. 3B. Therefore, when processor 12 executes instruction "lwa", the processor 12 can access data corresponding to the present access address from cache memory 30 and send the next access address to the cache memory 30 (described in greater detail below).

Figure 2:
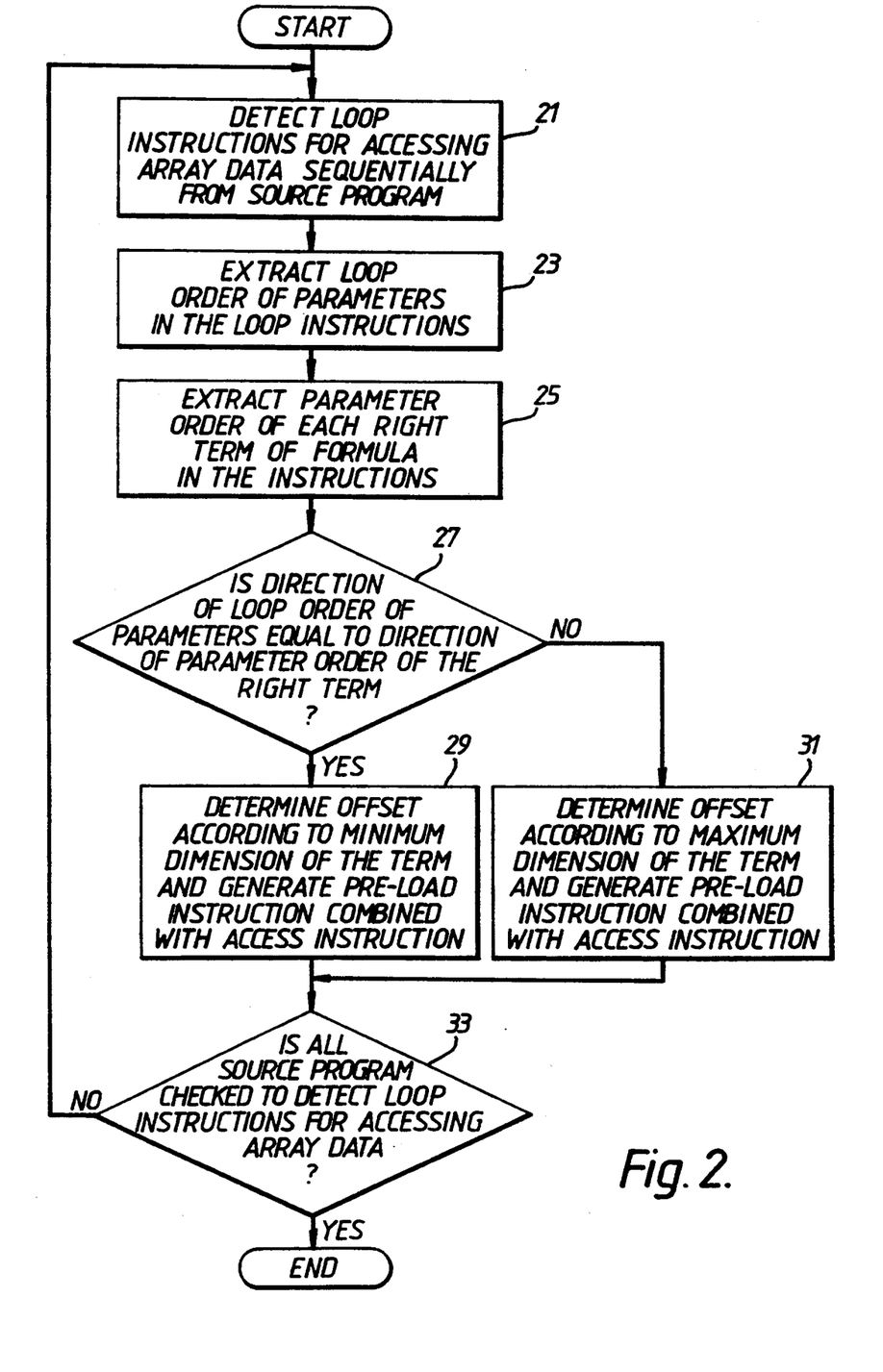
FIG. 2 is a flowchart of the method for compiling a source program to an object program according to the present invention.

As shown in FIG. 2, the compiling process of the present invention is explained. It is assumed that the source program shown in FIG. 3A is supplied to a computer. Initially, compiler means 80 (software) detects a series of loop instructions for accessing an array sequentially from the source program (step 21 in FIG. 2). In this source program, shown in FIG. 3A, loop instructions are included. "a[i][K]", "b[K][j]" are examples of array data to be accessed sequentially according to parameter "i", "j", "k". Therefore, this part is detected. Next compiler means 80 extracts a loop order of parameters in the loop instructions (step 23, in FIG. 2). In this case, according to the order of the loop instruction, the loop order of the parameters is as follows.

i→j→K   (7)

Next, compiler means 80 extracts the parameter order of each right term of the formula in part (step 25 in FIG. 2). In this case, each right term of formula is "a[i][K]", "b[K][j]". Therefore, parameter order is as follows.

a: i→K   (8)

b: K→j   (9)

Compiler means 80 checks whether the direction of the loop order of the parameters is equal to the direction of the parameter order of the right term or not (step 27 in FIG. 2). As for the right term "a[i][K]", directions (7) and (8) are equal. The minimum dimension of the array of data is "1". Therefore, compiler means 80 determines that the offset is "1" and generates a pre-load instruction combined with the second access instruction "lwa $24, 1($3)." (Step 29 in FIG. 2) As for the right term "b[K][j]", directions (7) and (9) are not equal. The maximum dimension of the term is "64" because of "b[64][64]" in the source program. Therefore, compiler means 80 determines that the offset is "64" and generates a pre-load instruction combined with the second access instructions "lwa $25, 64($4)." (Step 31 in FIG. 2) When the entire source program is checked to detect the loop instructions for accessing the array of data, the above-mentioned processing is complete (Step 33 in FIG. 2).

In FIG. 1, when cache memory 30 is accessed by processor 12, memory control section 34 examines whether the pre-load control signal PL is present or not. If the pre-load control signal PL is not present, the memory control section 34 processes as usual. If the pre-load control signal PL is present, memory control section 34 accesses data corresponding to the present access address from data memory section 32 and sends the data to the processor 12. After the memory control section 34 finishes accessing data, the memory control section 34 pre-loads that data corresponding to the pre-load address, which is sent by the processor 12, from main memory 20. In short, a data block including the data corresponding to the pre-load address is read from the main memory 20 and is transferred to the data memory section 32.

Figure 4A:
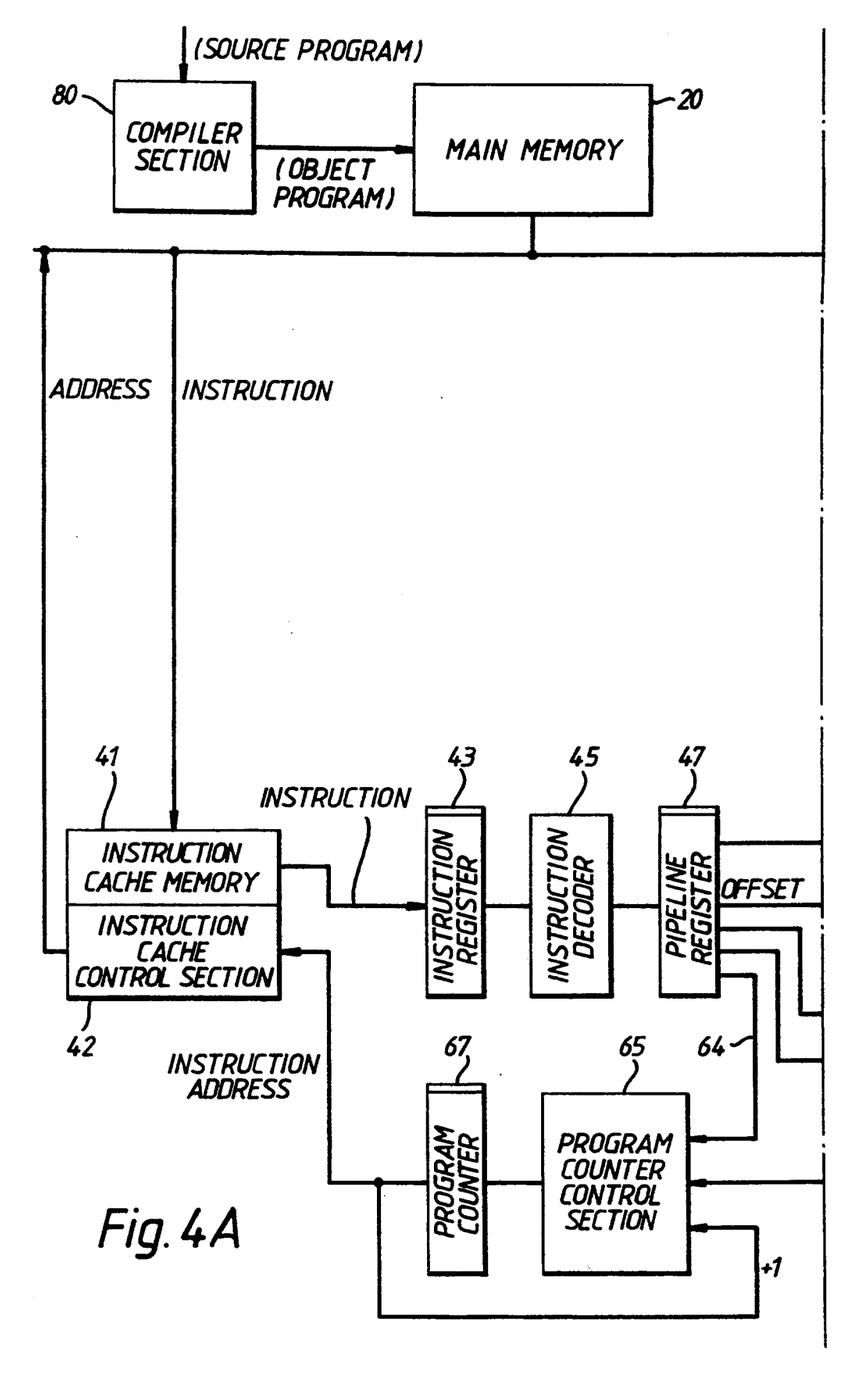
FIGS. 4A and 4B show is a circuit-block diagram of the processor shown in FIG. 1, according to the present invention.
Figure 4B:
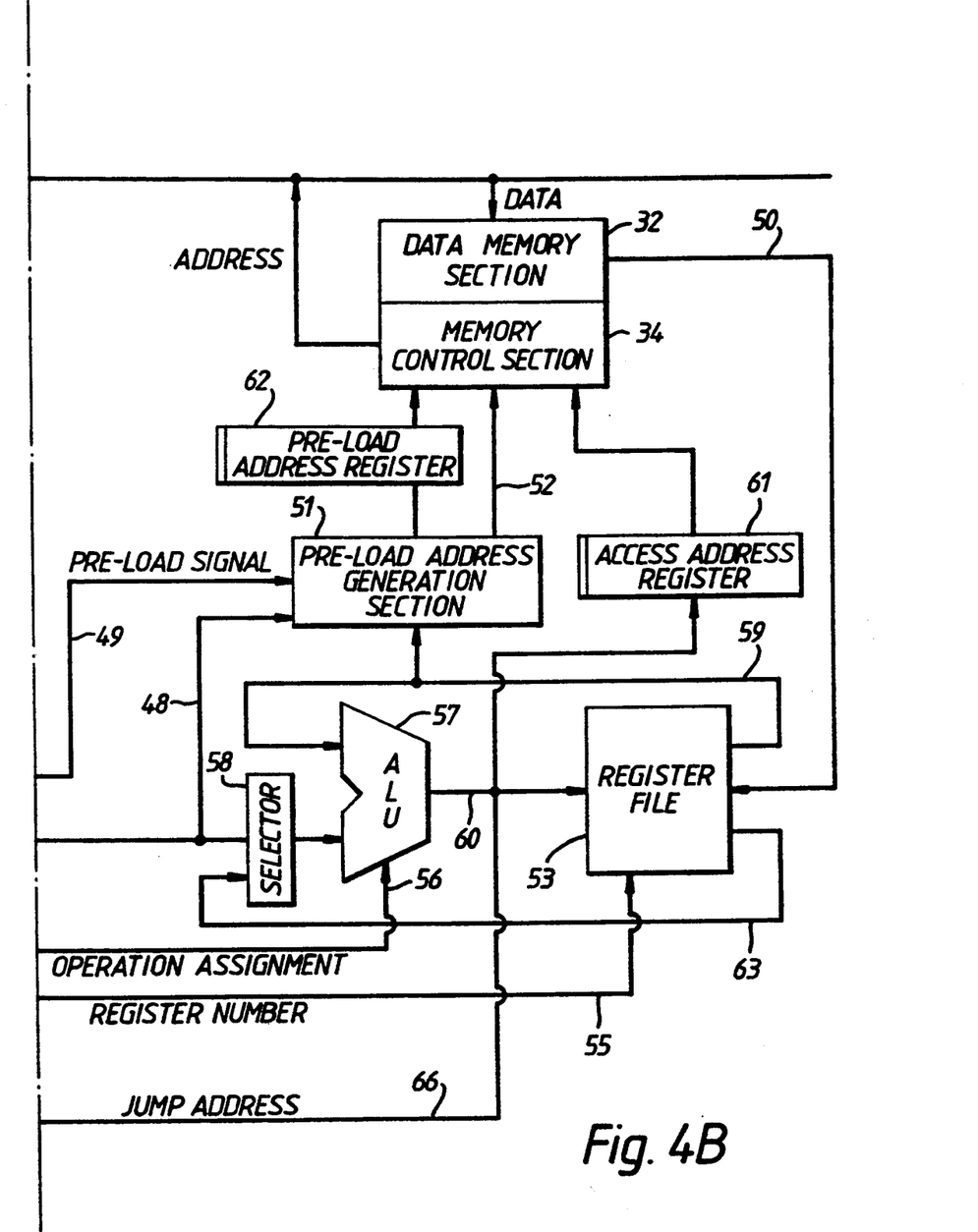
Figure 5:
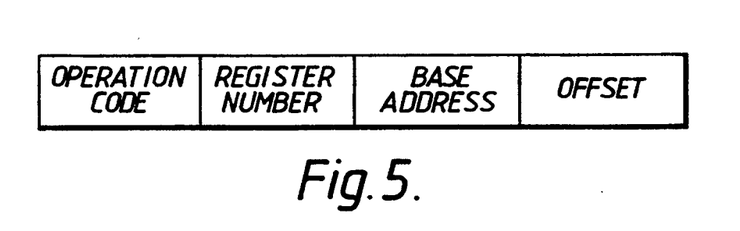
FIG. 5 depicts an instruction format according to the present invention.

FIGS. 4A and 4B show a block diagram of processor 12 shown in FIG. 1 in accordance with the present invention. FIG. 5 depicts an instruction format in accordance with the present invention. By using FIGS. 4A, 4B, and 5, operation of processor 12 is explained in detail. In FIGS. 4A, and 4B when instructions to be executed by processor 12 are stored in main memory 20, the instructions have already been compiled to object instructions. As mentioned earlier, these object instructions include a second access instruction combined with a pre-load instruction.

As broadly embodied in FIGS. 4A, and 4B at the initialization mode, a series of instructions to be executed by processor 12 are transferred from main memory 20 to an instruction cache memory 41. It is assumed that the access instruction is fetched from instruction cache memory 41 to instruction register 43. Instruction decoder 45 decodes the instruction sent from instruction register 43 and sends the instruction, which is divided into elements, to pipeline register 47. In this place, the access instruction is combined with a pre-load instruction consisting of four elements shown in FIG. 5. This instruction consists of an operation code, a register number, a base address and an offset. For example, as for the access instruction combined with the pre-load instruction in FIG. 3C, "lwa $25, 64($4)"

"lwa" is an operation code, "$25" is a register number "($4)" is a base address, "64" is an offset. The pipeline register makes a pre-load detection signal "on" through line 49 according to operation code "lwa". Offset "64" is supplied to pre-load address generation section 51 through line 48. "$25" and "($4)" are supplied to register file 53 through line 55. The base address stored in register "$4" is read from register file 53. The base address is transferred to ALU 57 and pre-load address generation section 51 through line 59. The base address is transferred to access address register 61 through ALU 57. The base address in the access address register 61 is sent to memory control section 34. The memory control section 34 accesses data corresponding to the above address from data memory section 32. The data, which is accessed by the memory control section 34, is stored in register "$25" of register file 53 through line 50. At the same time, ALU 57 adds the base address, which is received through line 59, to offset "64" which is received through selector 58. Then ALU 57 stores the addition result, which is a new base address, in register "$3" of register file 53 through line 60. On the other hand, pre-load generation section 51 adds the base address, which was received through line 59, to offset "64". Then, the addition result, which is a pre-load address, is sent to memory control section 34 through pre-load address register 62. At the same time, pre-load address generation section 51 sends a pre-load signal to memory control section 34 through line 52. Therefore, the data control section 34 sends the pre-load address to main memory 20. Then, data corresponding to the pre-load address are transferred from main memory 20 to data memory section 32. Simultaneously, pipeline register 47 sends a signal to read out the next instruction to program counter control section 65 through line 64.

The instruction address, which is incremented by "1", is sent to instruction cache control section 42 through program counter 67. Therefore, the next instruction is read out from instruction cache 41 to instruction register 43. Hence, the ALU supplies a jump address through line 66 according to the operation result. In this case, the jump address is supplied to instruction cache control section 42 through program counter control section 65 and program counter 67. Then an instruction corresponding to the jump address is read out from instruction cache 41 to instruction register 43. When an operation instruction other than an access instruction is executed by the processor, the processor processes as follows.

It is assumed that instruction

"mul $8, $24, $25"

fetched to pipeline register 47. Operation code "mul" is supplied to ALU 57 through line 56. Register number "$8, $24, $25" is supplied to register file 53 through line 55. Then, data stored in register "$24" is transferred from register file 53 to ALU 57 through line 59. Data stored in register "$25" is transferred from register file 53 to ALU 57 through line 63 and selector 58. ALU 57 multiplies the data corresponding to register $24" with the data corresponding to register "$25". Then ALU 57 stores the multiplication result in register "$8" of register file 53.

Figure 6:
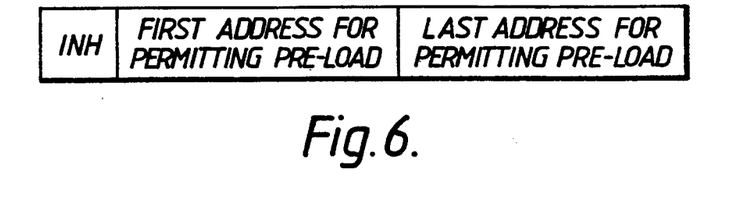
FIG. 6 depicts register information for limiting a pre-load in the cache memory according to the present invention.

FIG. 6 displays mode information for limiting a pre-load in memory control section 34. This mode information consists of a bit field "INH" for inhibiting pre-load, and an address limit for permitting pre-load. The address limit is the first address and last address in which data can be pre-loaded. When memory control section 34 receives the pre-load signal and pre-load address from pre-load address generation section 52, the memory control section 34 checks whether a pre-load is inhibited or not according to "INH." (For example, when processor 12 executes instructions for debugging, flag "INH" is set by "1" because it is not necessary for the debug to be executed quickly.) If flag "INH" is not set by "1", the memory control section 34 checks whether the pre-load address is within the address limit for permitting pre-load. For example, it is assumed that all of the array of data of the matrix are stored in region "A" of main memory 20 and other data are stored in region "B" of main memory 20. In this case, the first address and last address of region "A" is stored as address limit in memory control section 34. If the pre-load address is within the address limit for permitting a pre-load, the memory control section 34 accesses the pre-load address in main memory 20. Then, the data block including the data corresponding to the pre-load address is transferred from main memory 20 to cache memory 30 and stored in data memory section 32. Data which processor 12 accesses next is pre-loaded from main memory 20 to cache memory 30 while processor 12 executes the present access instruction.

When processor 12 executes the second access instruction combined with the pre-load instruction, a pre-load signal and a pre-load address are sent to memory control section 34 in FIG. 4B. However, only the pre-load signal may be sent to memory control section 34. In this case, memory control section 34 memorizes the access address sent by access address register 61 in order. When the pre-load signal is supplied by the pre-load address generation section 51, memory control section 34 calculates an offset (differences) between the present access address and the previous access address. Then, the section 34 adds the offset to the present access address as a pre-load address. Therefore, the section 34 can pre-load data from main memory 20 to data memory section 32 according to the pre-load address.

Figure 7A:
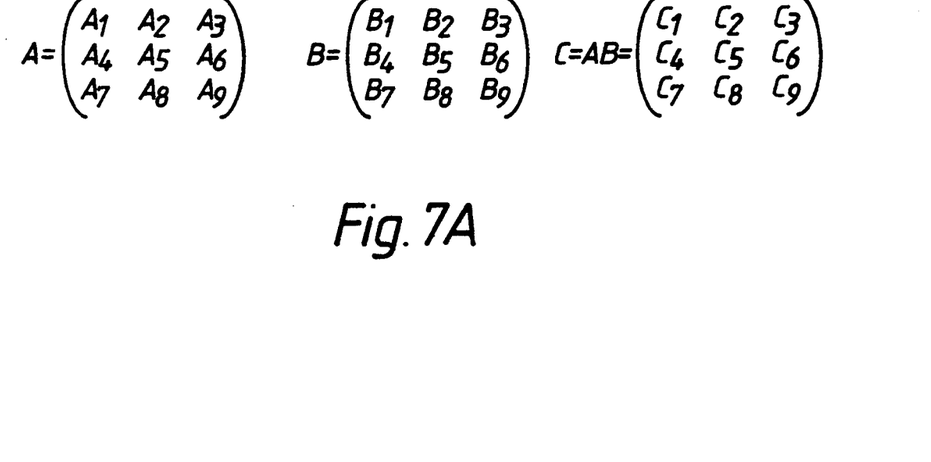
FIG. 7A is an example of an array of data in a matrix format.
Figure 7B:
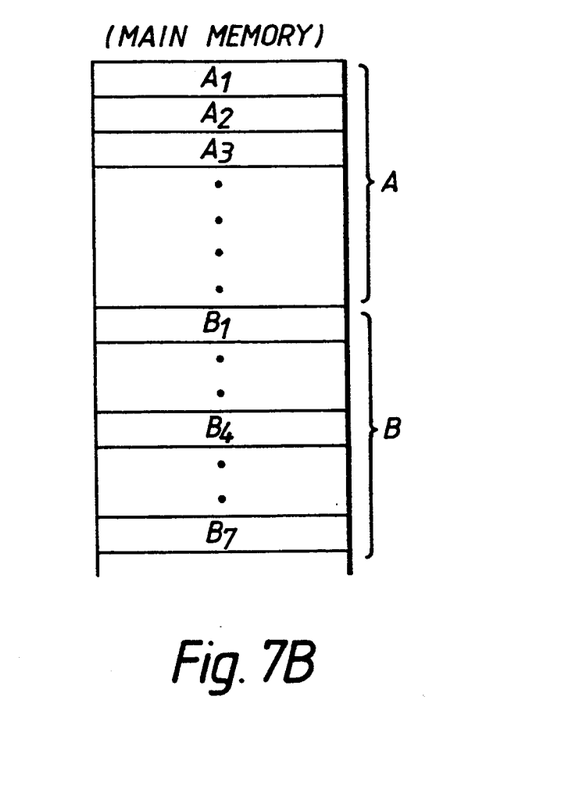
FIG. 7B depicts the array of data stored in cache memory.
Figure 7C:
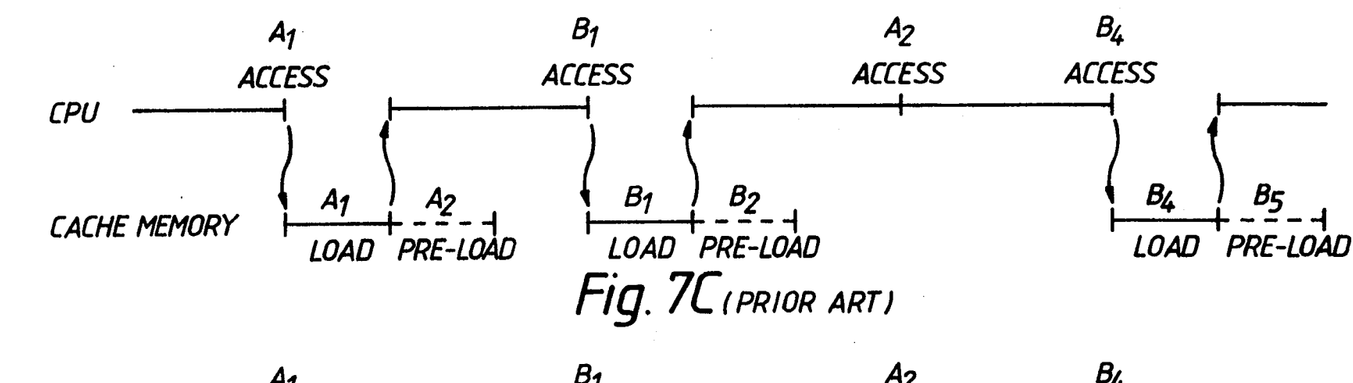
FIG. 7C is a time chart depicting pre-loading of the array of data according to the prior art.
Figure 7D:
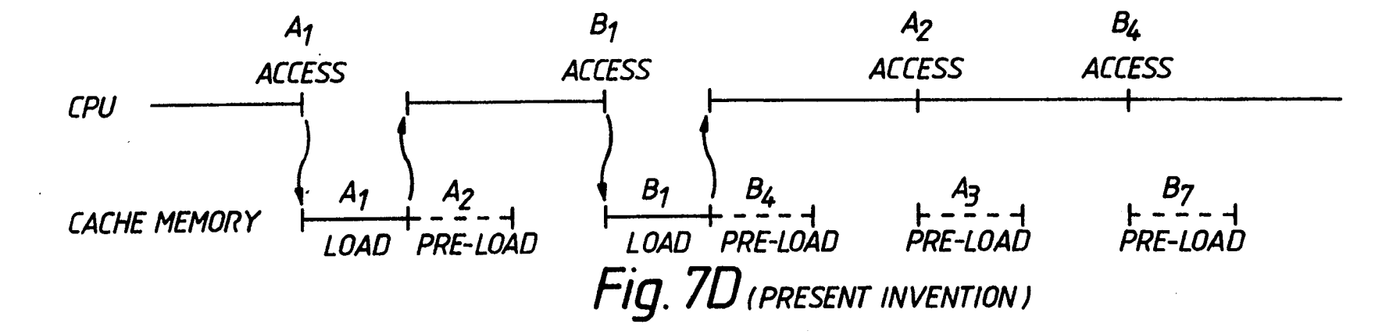
FIG. 7D is a time chart depicting pre-loading of the array of data according to the present invention.

FIG. 7A is an example of an array of data in a matrix format. FIG. 7B depicts the array of data as it is stored in main memory 20. FIG. 7C is a time chart depicting pre-loading the array of data according to the prior art. FIG. 7D is a time chart depicting pre-loading the array of data according to the present invention. By using FIGS. 7A, 7B, 7C and 7D, the pre-loading operation can be explained in detail.

Matrix A and B consist of nine elements (array data), respectively, as shown in FIG. 7A. Nine corresponding elements of matrix C are determined by multiplication of matrix A and B.

$$C_1 = A_1 B_1 + A_2 B_4 + A_3 B_7$$
$$C_2 = A_1 B_2 + A_2 B_5 + A_3 B_8$$
$$\vdots$$
$$C_9 = A_7 B_3 + A_8 B_6 + A_9 B_9$$

To calculate an element of matrix C, necessary elements of matrix A are successive. For example, to calculate $C_1$, elements $A_1$, $A_2$, $A_3$ of matrix A are used. However, necessary elements of matrix B are dispersed. For example, to calculate $C_1$, elements $B_1$, $B_4$, $B_7$ of matrix B are used. These elements of matrix A and B are stored in main memory 20 as shown in FIG. 7B. In region A of main memory 20, elements ($A_1$, $A_2$, $A_3$...) of matrix A are stored in order. In region B of main memory 20, elements ($B_1$, $B_2$, $B_3$...) of matrix B are stored in order.

FIG. 7C is a time chart of the method of pre-loading elements of a similar matrix according to the prior art. In FIG. 7C the processor calculates $C_1$ of matrix C by using $A_1$, $A_2$, $A_3$ of matrix A and $B_1$, $B_4$, $B_7$ of matrix B according to the following formula. Cache memory does not store these elements at the beginning.

$$C_1 = A_1B_1 + A_2B_4 + A_3B_7$$

Initially, the processor attempts to access $A_1$ in cache memory. Cache memory does not store $A_1$. Therefore, cache memory loads $A_1$ from main memory and pre-loads $A_2$ which is the next data after $A_1$. The processor reads out $A_1$ from cache memory. Next, the processor attempts to access $B_1$ in cache memory. Cache memory does not store $B_1$. Therefore, cache memory loads $B_1$ from main memory and pre-loads $B_2$ which is the next data after $B_1$. The processor reads out $B_1$ from cache memory and multiplies $A_1$ and $B_1$. Next, the processor attempts to access $A_2$ in cache memory. Because $A_2$ has been pre-loaded, cache memory stores $A_2$. Therefore, the processor can read out $A_2$ from cache memory. Next, the processor attempts to accesses $B_4$ from cache memory. Cache memory does not store $B_4$. Therefore, cache memory must load $B_4$ from main memory, at the same time pre-loading $B_5$ which is the next data after $B_4$. In short, in the prior art, whenever the processor accesses an element of matrix B, cache memory must always load that element from main memory. Accordingly, when the system attempts to access an array of data (element) whose offset (address interval) is large, the prior method, which pre-loads the next sequential address data of the presently accessed data when cache-miss happens, is unsatisfactory.

FIG. 7D is a time chart of the method for pre-loading elements of a matrix according to the present invention. In FIG. 7D, initially processor 12 accesses $A_1$ and a sends pre-load signal and pre-load address to cache memory 30. Cache memory 30 does not store $A_1$. Therefore, cache memory 30 loads $A_1$ from main memory 20, and at the same time pre-loads $A_2$ according to the pre-load address. The processor 12 reads out $A_1$ from cache memory 30. Next, the processor 12 accesses $B_1$ and sends a pre-load signal and pre-load address to cache memory 30. Cache memory 30 does not store $B_1$. Therefore, cache memory 30 loads $B_1$ from main memory 20 and at the same time pre-loads $B_4$ according to the pre-load address. The processor 12 reads out $B_1$ from cache memory 30 and multiplies $A_1$ and $B_1$. Next, the processor 12 accesses $A_2$ and sends a pre-load signal and pre-load address to cache memory 30. Cache memory 30 stores $A_2$. Therefore, processor 12 reads out $A_2$ from cache memory 30 immediately. At the same time, cache memory 30 pre-loads $A_3$ according to the pre-load address from main memory 20. Next, the processor accesses $B_4$ and sends pre-load signal and pre-load address to cache memory 30. Cache memory 30 stores $B_4$. Therefore, processor 12 reads out $B_4$ from cache memory 30 immediately. At the same time, cache memory 30 pre-loads $B_7$ according to the pre-load address from main memory 20. In short, in the present invention, when processor 12 accesses an element of matrix B, processor 12 reads out the element from cache memory 30 immediately. Accordingly, when accessing an array of data (element) whose offset (address interval) is large, the present invention, which pre-loads the next data according to the pre-load address, is very effective.

When data corresponding to the pre-load address is pre-loaded from main memory 20 to cache memory 30, data (old data) which is already stored in cache memory 30 is replaced to main memory 20. In this case, in a program for calculating the array of data of a matrix, processor 12 accesses not only array data but also the other data in cache memory 30. For example, in FIG. 3C, the other data are stored in register "$5" (store address for calculation result). The other data in cache memory 30 are accessed frequently by processor 12 when processor 12 executes the program for calculating the array of data of a matrix. Therefore, if new array data is pre-loaded to cache memory 30 in order, it happens that the other data are replaced reluctantly from cache memory 30. To prevent this defect, data memory section 32 is divided into plural areas. Each area is called a "way." Pre-loading of data is controlled for each way.

Figure 8:
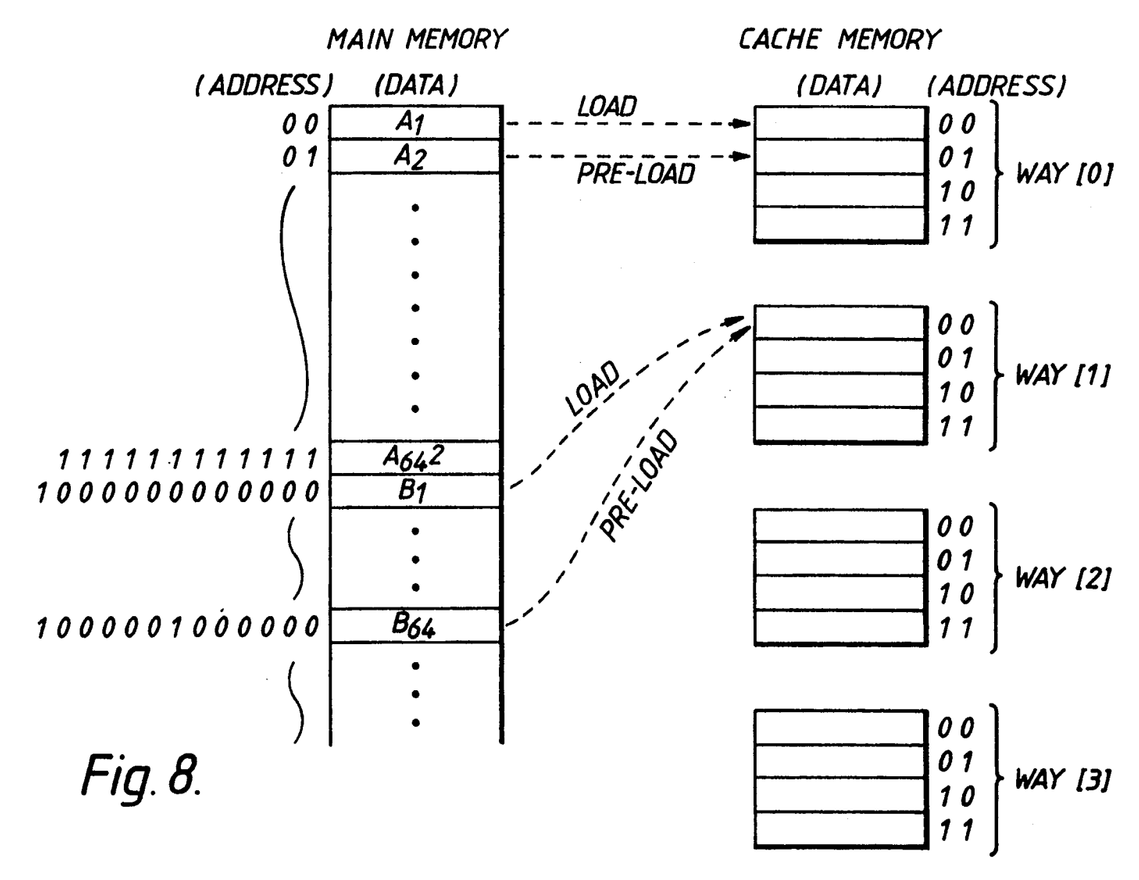
FIG. 8 is a representative graph depicting operation of the cache memory according to the present invention.

For example, as embodied in FIG. 8, data memory section 32 is divided into four ways, which are from way [0] to way [3]. Only three ways which are from way [0] to way [2] comprise areas to write pre-loaded data and to replace old data. Way [3] is an area to write the other data. Accordingly, pre-loaded array data (new array data) are written in one of three ways from way [0] to way [2] and old array data corresponding to address, which new array data are written, are replaced to main memory 20. As shown in FIG. 8, four addresses "00" "01" "10" "11" are assigned to each way. When data corresponding to an access address are read out from main memory 20, the data are written in address of way, corresponding to low order two bit of the access address. For example, an array of data are accessed from cache memory 30 according to following instructions shown in FIG. 3C.

lwa $24, 1($3)

lwa $25, 64($4)

It is assumed that the address stored in register ($3) is "00" and the address stored in register ($4) is "1000000000000 $(=2^{12})$." Data corresponding to address "00" is accessed from cache memory 30. But at the beginning, cache memory 30 does not store the data. Therefore, memory control section 34 reads out data corresponding to address "00" from main memory 20. The data are written in address "00" of way [0]. Then, the data are stored in register "$24" of register file 53. At the same time, memory control section 34 reads out data corresponding to pre-load address "01" from main memory 20 (because present access address "00"+offset "1"=pre-load address "01"). The pre-loaded data are written in address "01" of way [0]. Next, data corresponding to address "$(2^{12})$" is accessed from cache memory 30. But at the beginning, cache memory 30 does not store the data. Therefore, memory control section 34 reads out data corresponding to address "(2)" from main memory 20. The data are written in address "00" of way [1]. Then, the data are stored in register "$25" of register file 53. At the same time, memory control section 34 reads out data corresponding to pre-load address "1000001000000$(=(=2^{12}+2^6)$" from main memory 20 (because, present access address "$2^{12}$"+offset "64=$(2^6)$"=pre-load address $(=2^{12}+2^6))$. The pre-load data are written in address "00" of way [1]. At that time the data corresponding to address "$(2^{12})$" (old array data) are erased. But this is not a problem because the old array data were already stored in register "$25" and the old array data are not used for a while after the old array data are used for calculation.

In the ways, an array of data of matrix A are stored in way [0] in order, while an array of data of matrix B are stored in way [1] in order. The other data except array data are stored in way [3]. In short, pre-load and re-placement (erase) are executed among only array data in a predetermined way in cache memory 30. The other data except for array data are left in way [3] of cache memory 30. Therefore, array data, which are accessed by processor 12 next, can be pre-loaded effectively without replacing the other necessary data from cache memory 30.

Additional advantages and modifications will readily occur to those skilled in the art. The invention in its broader aspects is not limited to the specific details shown and described. The scope of the invention is defined by the claims and their equivalents. Departures may be made from the details described above, without departing from the spirit or scope of the applicant's inventive concept.

What is claimed is:

1. A computer comprising:
   a main memory for storing a plurality of array data;
   a cache memory coupled to said main memory for preloading and temporarily storing a first array data and a second array data of said plurality of array data stored in said main memory; and
   a processor coupled to said cache memory and having an access instruction combined with a preload instruction, which includes a base-address and an offset as operand, wherein the base-address is an access address of the access instruction and the offset is address interval between two array data to be accessed in succession in the main memory, and including means for indicating a pre-load signal and a pre-load address according to the base-address and the offset to the cache memory when the processor accesses said first array data from the cache memory according to the access instruction combined with the pre-load instruction,
   wherein, in response to said pre-load signal, said cache memory pre-loads said second array data from the main memory according to the pre-load address, said second array data being data to be accessed next in succession by the processor.

2. The computer according to claim 1, wherein the cache memory pre-loads said second array data to be accessed next, immediately alter the processor accesses said first array data stored in the cache memory according to base-address.

3. The computer according to claim 1, wherein the cache memory includes means for memorizing an address formerly accessed in order by the processor, and for determining a pre-load address according to the address accessed by the processor when the processor indicates the pre-load signal.

4. The computer according to claim 1, wherein the cache memory includes a plurality of ways for storing data respectively, and means for pre-loading data from the main memory to a predetermined storage portion.

5. The computer according to claim 1, wherein the cache memory includes means for memorizing mode-information whether pre-load should be permitted or not, and means for determining whether pre-load is executed or not according to the mode-information when the processor indicates the pre-load signal.

6. The computer according to claim 5, wherein the cache memory further includes means for memorizing address limit information which corresponding array of data should be pre-loaded, and means for executing a pre-load if the pre-load address is within the address limit when the processor indicates the pre-load signal.

* * * * *

UNITED STATES PATENT AND TRADEMARK OFFICE
CERTIFICATE OF CORRECTION

PATENT NO. : 5,371,865
DATED : December 06, 1994
INVENTOR(S) : Takeshi Aikawa et al.

It is certified that error appears in the above-indentified patent and that said Letters Patent is hereby corrected as shown below:

Claim 2, column 12, line 11 change "alter" to --after--.

Claim 2, column 12, line 13 after "to" insert --the--.

Signed and Sealed this

Thirteenth Day of June, 1995

Attest:

BRUCE LEHMAN

Attesting Officer     Commissioner of Patents and Trademarks